(12) United States Patent
Geng et al.

(10) Patent No.: US 12,707,335 B2
(45) Date of Patent: Aug. 11, 2026

(54) PACKET FORWARDING METHOD, PACKET PROCESSING METHOD, AND DEVICE

(71) Applicant: Huawei Technologies Co., Ltd., Shenzhen (CN)

(72) Inventors: Xuesong Geng, Beijing (CN); Jie Dong, Beijing (CN); Dawei Fan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 390 days.

(21) Appl. No.: 18/361,192

(22) Filed: Jul. 28, 2023

(65) Prior Publication Data

US 2023/0370899 A1 Nov. 16, 2023

Related U.S. Application Data

(63) Continuation of application No. PCT/CN2021/112679, filed on Aug. 16, 2021.

(30) Foreign Application Priority Data

Jan. 29, 2021 (CN) ......................... 202110130482.2

(51) Int. Cl.
*H04W 28/16* (2009.01)
*H04L 41/0893* (2022.01)

(52) U.S. Cl.
CPC ......... *H04W 28/16* (2013.01); *H04L 41/0893* (2013.01)

(58) Field of Classification Search
CPC ............. H04W 28/16; H04W 28/0268; H04W 28/0263; H04L 41/0893; H04L 45/50;
(Continued)

(56) References Cited

U.S. PATENT DOCUMENTS 11,024,144 B2 * 6/2021 Bordeleau ............. H04L 47/824
2019/0124704 A1 * 4/2019 Sun ......................... H04L 47/24
(Continued)

FOREIGN PATENT DOCUMENTS

CN 107517488 A 12/2017
CN 108616995 A 10/2018
(Continued)

OTHER PUBLICATIONS

3GPP TS 23.501 V16.7.0 (Dec. 2020), "3rd Generation Partnership Project; Technical Specification Group Services and System Aspects; System architecture for the 5G System (5GS); Stage 2 (Release 16)", total 450 pages.

(Continued)

*Primary Examiner* — Cheikh T Ndiaye
(74) *Attorney, Agent, or Firm* — Slater Matsil, LLP

(57) ABSTRACT

Embodiments of this application provide a packet forwarding method, a packet processing method, and a device, to determine a network slice that corresponds to a packet and that is of a transport network. The packet forwarding method includes the following steps: A first device obtains a first packet. The first device is a network device in an access network or in a mobile core network. The first device determines network slice mapping information based on the first packet. The first device generates a second packet based on the first packet. The second packet includes the network slice mapping information. The first device sends the second packet to a second device. The second device is a network device in a transport network.

20 Claims, 6 Drawing Sheets

(58) Field of Classification Search
CPC .. H04L 45/85; H04L 12/4641; H04L 41/5048
See application file for complete search history.

(56) References Cited

U.S. PATENT DOCUMENTS

| | | | | |
|---|---|---|---|---|
| 2019/0141760 | A1* | 5/2019 | Stille | H04W 76/11 |
| 2020/0351766 | A1* | 11/2020 | Young | H04W 40/246 |
| 2021/0120484 | A1* | 4/2021 | Thorat | H04L 41/40 |

FOREIGN PATENT DOCUMENTS

| | | | | | |
|---|---|---|---|---|---|
| CN | 114513421 | A | * | 5/2022 | H04W 28/16 |
| EP | 3796717 | A1 | * | 3/2021 | H04L 61/5007 |
| JP | 2018186450 | A | | 11/2018 | |
| WO | 2020010957 | A1 | | 1/2020 | |
| WO | WO-2020014337 | A1 | * | 1/2020 | H04L 47/782 |

OTHER PUBLICATIONS

3GPP TS 28.530 V17.0.0 (Dec. 2020), "3rd Generation Partnership Project; Technical Specification Group Services and System Aspects; Management and orchestration; Concepts, use cases and requirements (Release 17)", total 31 pages.

X. Geng et al., "5G End-to-end Network Slice Mapping from the view of Transport Network draft-geng-teas-network-slice-mapping-01", IETF, Apr. 23, 2020, total 14 pages.

* cited by examiner

PACKET FORWARDING METHOD, PACKET PROCESSING METHOD, AND DEVICE

CROSS-REFERENCE TO RELATED APPLICATIONS

This application is a continuation of International Application No. PCT/CN2021/112679, filed on Aug. 16, 2021, which claims priority to Chinese Patent Application No. 202110130482.2, filed on Jan. 29, 2021. The disclosures of the aforementioned applications are hereby incorporated by reference in their entireties.

TECHNICAL FIELD

This application relates to the field of communication technologies, and in particular, to a packet forwarding method, a packet processing method, and a device.

BACKGROUND

A network slice technology is a technology for dividing a network into a plurality of independent networks, and is a key technology of a 5th generation mobile network (5G). By using the network slice technology, one network device may have a plurality of mutually isolated network slices. Different network slices may have different transmission features. In this way, during data transmission, the network device may select, based on a feature of to-be-transmitted data, a proper network slice to transmit the data, to provide mutually isolated network environments for different application scenarios, so that network functions and features may be customized for the different application scenarios based on respective requirements, to ensure different service requirements.

An existing 5G network includes an access network (AN), a transport network (TN), and a mobile core network (CN). The network device includes a network device in the access network, a network device in the transport network, and a network device in the mobile core network. The network device in the access network may receive a packet sent by a terminal device, and send the packet to the network device in the mobile core network by using the network device in the transport network. Correspondingly, the network device in the mobile core network may also send the packet to the network device in the access network by using the network device in the transport network, and then the network device in the access network sends the packet to the terminal device. When the transport network is divided into a plurality of network slices, after receiving the packet, the network device in the transport network needs to determine a network slice corresponding to the packet, to transmit the packet by using the network slice that matches the packet and that is of the transport network.

SUMMARY

Embodiments of this application provide a packet forwarding method, a packet processing method, and a device, to determine a network slice that corresponds to a packet and that is of a transport network, so as to transmit the packet by using the corresponding network slice of the transport network.

According to a first aspect, a packet forwarding method is provided. The method is applied to a first device, and the first device is a network device in an access network or a network device in a mobile core network. The method specifically includes the following steps: The first device obtains a first packet through the access network or the mobile core network. The first packet is a packet that needs to be sent to the network device in the mobile core network or the network device in the access network through a transport network. The first device determines network slice mapping information based on the first packet. The network slice mapping information is used by a network device in the transport network to determine a network slice that corresponds to the first packet and that is of the transport network. For example, the network slice mapping information may include information about the access network or the mobile core network, or may include information about the network slice of the transport network. After determining the network slice mapping information, the first device may generate, based on the first packet and the network slice mapping information, a second packet that includes the network slice mapping information, and send the second packet to a second device. The second device is the network device in the transport network. Before the packet is transmitted to the network device in the transport network, the network device in the access network or in the mobile core network may determine in advance the network slice mapping information for determining a network slice that forwards the packet and that is of the transport network, and include the network slice mapping information in the second packet sent to the second device. In this way, after receiving the packet, the network device in the transport network may determine a corresponding network slice of the transport network based on the network slice mapping information, to transmit the second packet by using the corresponding network slice of the transport network.

In a possible design, the network slice mapping information may include a first network slice identifier, or may include any one or more of the following: a quality of service (Quality of Service, QoS) parameter (QoS parameter), a virtual private network (VPN) identifier, a quality of service parameter identifier (QoS parameter ID), a service slice identifier, a resource slice identifier, and a transport network slice identifier. The first network slice identifier identifies a network slice that transmits the first packet and that is of the access network, or identifies a network slice that transmits the first packet and that is of the core network. The first network slice identifier may be a single network slice selection assistance information (S-NSSAI) identifier, a network slice instance (NSI) identifier, a network slice subnet instance (NSSI) identifier, or the like. The quality of service parameter is a parameter that describes quality of service required by the access network, the mobile core network, or a network slice network that transmits the first packet. The quality of service parameter identifier is an identifier of the quality of service parameter. The VPN identifier is an identifier of a VPN used by the first packet. The transport network slice identifier identifies the network slice that corresponds to the first packet and that is of the transport network. The service slice identifier identifies a service slice that transmits the second packet and that is of the transport network. The resource slice identifier identifies a resource slice that transmits the second packet and that is of the transport network.

The first network device may determine the network slice mapping information in the following three possible implementations.

Implementation 1: The first device determines the network slice mapping information based on the first network slice identifier. The first network slice identifier identifies the network slice that transmits the first packet and that is of the access network, or identifies the network slice that transmits the first packet and that is of the core network. Specifically, the first device first determines the first network slice identifier based on the first packet, and then determines the network slice mapping information based on the first network slice identifier.

Optionally, how the first device determines the first network slice identifier in Implementation 1 may be specifically that the first network device determines the first network slice identifier based on one or more of a service identifier, a flow identifier, and a user identifier of the first packet. The first device may further determine the first network slice identifier based on attribute information or requirement information of the first packet.

Optionally, the first network device stores a correspondence between the first network slice identifier and the network slice mapping information. In Implementation 1, how the first device determines the network slice mapping information based on the network slice identifier may be specifically that the first device determines the network slice mapping information based on the first network slice identifier and the correspondence.

Implementation 2: The first device determines the network slice mapping information based on attribute information of the first packet. The attribute information of the first packet represents an attribute of the first packet, and may include, for example, any one or more of a QoS level of the first packet, a port number of a network port used by the first device to receive the first packet, and a network segment to which the first packet belongs.

Implementation 3: The first device determines the network slice mapping information based on requirement information for transmitting the first packet. The requirement information of the first packet indicates quality of service required by the first packet, and may include, for example, a bandwidth required for transmitting the first packet, a maximum delay corresponding to transmitting the first packet, and a maximum packet loss rate corresponding to the first packet.

The foregoing three possible implementations do not constitute a limitation on embodiments of this application, and a person skilled in the art may design the implementations based on an actual situation.

In a possible design, the second packet includes any one or more of an internet protocol version 6 (IPv6) extension header, an IPv6 basic header, an Ethernet header, and a multi-protocol label switching (MPLS) header. The any one or more of the IPv6 extension header, the IPv6 basic header, the Ethernet header, and the MPLS header carry the network slice mapping information.

In a possible design, the IPv6 extension header includes one or more of the following: a hop by hop options header, a destination options header, a routing header, and a segment routing header.

In a possible design, the network slice mapping information is carried in a type-length-value (TLV) field of the IPv6 extension header.

In a possible design, the network slice mapping information is carried in any one or more of a source address (SA) field, a destination address (DA) field, or a flow label field of the IPv6 basic header.

In a possible design, the Ethernet header includes a virtual local area network (VLAN) identifier (VLAN ID) field, and the slice mapping information is carried in the VLAN ID field.

In a possible design, when the first device is the network device in the access network, the first device is a base station or customer premises equipment (CPE), and the second device is a router or a switch.

According to a second aspect, a packet processing method is provided. The method is applied to a second device, and the second device may be a network device in a transport network. The method includes the following steps: The second device receives a second packet from a first device. The second packet includes network slice mapping information. The first device is a network device in an access network or in a mobile core network, and the second device is the network device in the transport network. The network slice mapping information is generated by the first device based on a first packet, and the second packet is generated by the first device based on the first packet and the network slice mapping information. The second device may determine, based on the network slice mapping information, a corresponding network slice of the transport network, namely, a network slice that transmits the second packet and that is of the transport network. After determining the network slice of the transport network, the second device sends the second packet by using a network resource corresponding to the network slice of the transport network. In this way, the second packet received by the second device as the device in the transport network already includes the network slice mapping information for determining the network slice of the transport network. After receiving the packet, the network device in the transport network may determine the corresponding network slice of the transport network based on the network slice mapping information, to transmit the second packet by using the corresponding network slice of the transport network.

For content included in the network slice mapping information and a possible implementation of a location carried in the second packet, refer to the foregoing descriptions. Details are not described herein again.

In a possible design, the first device is a base station or customer premises equipment, and the second device is a router or a switch.

In a possible design, the network resource includes any one or more of a bandwidth resource, a cache resource, and a queue resource.

According to a third aspect, a device is provided. The device is used in a network system including a plurality of devices. The plurality of network devices include a first device and a second device. The device is the first device. The device includes an obtaining unit, configured to obtain a first packet, where the first device is a network device in an access network or in a mobile core network; a processing unit, configured to: determine network slice mapping information based on the first packet, and generate a second packet based on the first packet, where the second packet includes the network slice mapping information; and a sending unit, configured to send the second packet to the second device, where the second device is a network device in a transport network, and the network slice mapping information is used to determine a network slice that forwards the second packet and that is of the transport network.

In a possible design, the network slice mapping information includes one or more of the following: a quality of service parameter, a virtual private network identifier, a quality of service parameter identifier, a service slice identifier, a resource slice identifier, and a transport network slice identifier.

In a possible design, the network slice mapping information includes a first network slice identifier, and the first network slice identifier identifies a network slice that transmits the first packet and that is of the access network, or identifies a network slice that transmits the first packet and that is of the core network.

In a possible design, the processing unit is configured to: determine a first network slice identifier based on the first packet, where the first network slice identifier identifies a network slice that transmits the first packet and that is of the access network, or identifies a network slice that transmits the first packet and that is of the core network; and determine the network slice mapping information based on the first network slice identifier.

In a possible design, the first network device stores a correspondence between the first network slice identifier and the network slice mapping information. The processing unit is configured to determine the network slice mapping information based on the first network slice identifier and the correspondence.

In a possible design, the processing unit is configured to: determine the network slice mapping information based on attribute information of the first packet, or determine the network slice mapping information based on requirement information for transmitting the first packet.

In a possible design, the processing unit is configured to determine the first network slice identifier based on one or more of a service identifier, a flow identifier, and a user identifier of the first packet.

For a possible implementation of a location of the network slice mapping information carried in the second packet, refer to the foregoing descriptions. Details are not described herein again.

According to a fourth aspect, a device is provided. The device is used in a network system including a plurality of devices. The plurality of network devices include a first device and a second device. The device is the second device. The device includes a receiving unit, configured to receive a second packet from the first device, where the second packet includes network slice mapping information, the first device is a network device in an access network or in a mobile core network, and the second device is a network device in a transport network; a processing unit, configured to determine a corresponding network slice of the transport network based on the network slice mapping information; and a sending unit, configured to send the second packet by using a network resource corresponding to the network slice of the transport network.

In a possible design, the network slice mapping information includes one or more of the following: a VPN identifier, a quality of service parameter identifier, a service slice identifier, a resource slice identifier, and a transport network slice identifier.

In a possible design, the network slice mapping information includes one or more of the following: a first network slice identifier and a quality of service parameter. The first network slice identifier identifies a network slice that transmits a first packet and that is of the access network, or identifies a network slice that transmits a first packet and that is of the core network.

In a possible design, the processing unit is configured to determine a slice identifier of the corresponding network slice of the transport network based on the network slice mapping information and a correspondence. The correspondence is a correspondence between the network slice mapping information and a transport network slice identifier. The transport network slice identifier is a slice identifier of the network slice of the transport network. The sending unit is configured to send the second packet by using a network resource corresponding to the transport network slice identifier.

For a possible implementation of a location of the network slice mapping information carried in the second packet, refer to the foregoing descriptions. Details are not described herein again.

In a possible design, the first device is a base station or customer premises equipment, and the second device is a router or a switch.

In a possible design, the network resource includes any one or more of a bandwidth resource, a cache resource, and a queue resource.

According to a fifth aspect, a device is provided. The device is used in a network system including a plurality of devices. The plurality of devices include a first device and a second device. The device is the first device, and the first device includes a processor and a network interface. The network interface is configured to: receive and send a packet. The processor is configured to perform the method according to any one of the first aspect or the possible designs of the first aspect.

In a possible design, the first device further includes a memory, and the memory may be configured to store instructions or program code. The processor is configured to invoke the instructions or the program code in the memory, to perform the method according to any one of the first aspect or the possible designs of the first aspect.

According to a sixth aspect, a device is provided. The device is used in a network system including a plurality of devices. The plurality of devices include a first device and a second device. The device is the second device, and the second device includes a processor and a network interface. The network interface is configured to: receive and send a packet. The processor is configured to perform the method according to any one of the second aspect or the possible designs of the second aspect.

In a possible design, the second device further includes a memory, and the memory may be configured to store instructions or program code. The processor is configured to invoke the instructions or the program code in the memory, to perform the method according to any one of the second aspect or the possible designs of the second aspect.

According to a seventh aspect, a network system is provided. The network system includes the first device according to the third aspect and the second device according to the fourth aspect, or includes the first device according to the fifth aspect or the second device according to the sixth aspect.

According to an eighth aspect, a computer-readable storage medium is provided, including instructions, a program, or code. When the instructions, the program, or the code is executed on a computer, the computer is enabled to perform the method according to any one of the possible implementations of the first aspect or the second aspect.

According to a ninth aspect, a computer program product including computer instructions is provided. When the computer program product runs on a network device, the network device is enabled to perform the method according to any one of the possible implementations of the first aspect or the second aspect.

According to a tenth aspect, a chip is provided, including a memory and a processor. The memory is configured to store instructions or program code. The processor is configured to: invoke the instructions or the program code from the memory and run the instruction or the program code, to perform the method according to any one of the first aspect or the possible designs of the first aspect, or perform the method according to any one of the second aspect or the possible designs of the second aspect.

According to an eleventh aspect, a chip is provided. The chip includes a processor but does not include a memory. The processor is configured to: read and execute instructions or program code stored in a memory outside the chip. When the instructions or the program code is executed, the processor performs the method according to any one of the first aspect or the possible designs of the first aspect, or the processor performs the method according to any one of the second aspect or the possible designs of the second aspect.

DETAILED DESCRIPTION OF ILLUSTRATIVE EMBODIMENTS

With reference to the accompanying drawings, the following describes a packet forwarding method and a packet processing method provided in the conventional technology and embodiments of this application.

An access network, a transport network, and a mobile core network are first described with reference to FIG. 1.

Figure 1:
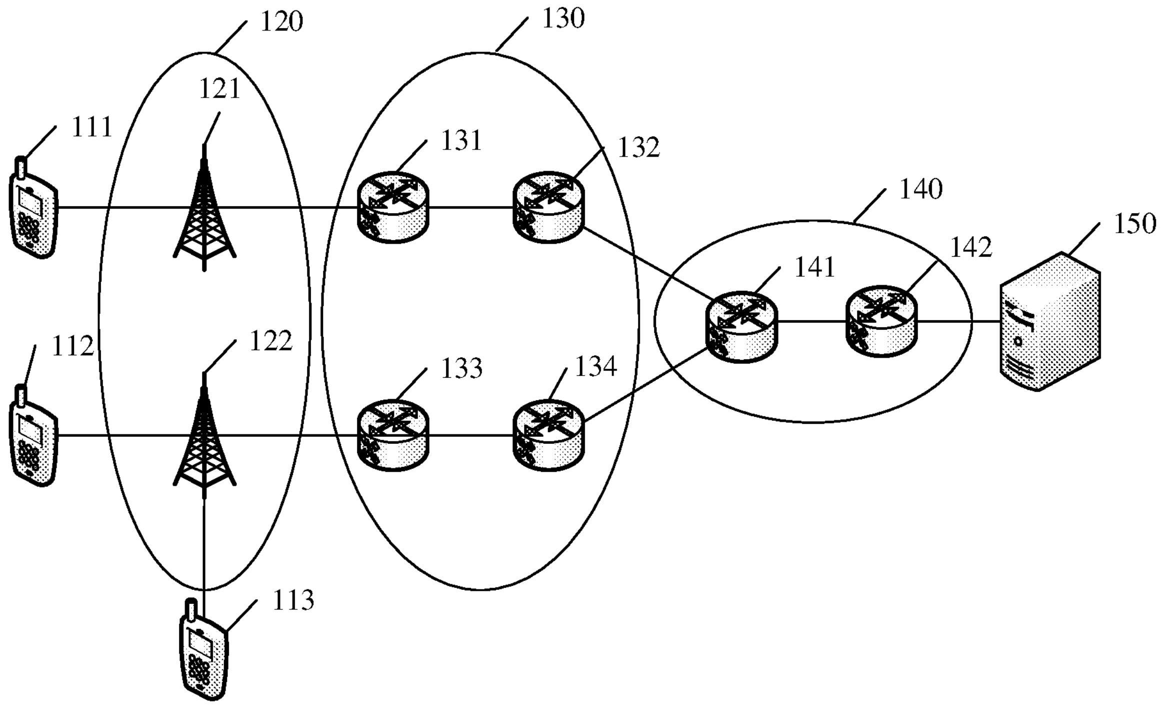
FIG. 1 is a schematic diagram of a structure of a system 100 according to an embodiment of this application.

FIG. 1 is a schematic diagram of a structure of a system 100 according to an embodiment of this application. The system 100 includes a terminal device 111, a terminal device 112, a terminal device 113, a base station 121, a base station 122, a network device 131, a network device 132, a network device 133, a network device 134, a gateway device 141, a network device 142, and a server 150. The base station 121 is connected to the terminal device 111 and the network device 131. The base station 122 is connected to the terminal device 112, the terminal device 113, and the network device 133. The network device 131 is connected to the network device 132. The network device 133 is connected to the network device 134. The gateway device 141 is connected to the network device 132, the network device 134, and the network device 142. The server 150 is connected to the network device 142.

In this embodiment of this application, the base station 121 and the base station 122 are network devices in the access network. The network device 131, the network device 132, the network device 133, and the network device 134 are network devices in the transport network. The gateway device 141 and the network device 142 are network devices in the mobile core network. Correspondingly, in this embodiment of this application, an access network 120 includes a network between the base station 121 and the terminal device 111, a network between the base station 122 and the terminal device 112, and a network between the base station 122 and the terminal device 113. A transport network 130 includes a network between the network device 131 and the network device 132 and a network between the network device 133 and the network device 134. A mobile core network 140 includes a network between the gateway device 141 and the network device 142. Optionally, when any one of the terminal device 111, the terminal device 112, and the terminal device 113 connects to the network device in the access network through a wireless network, a network between the terminal device and the network device in the access network may be referred to as a radio access network (RAN).

The following describes a packet forwarding process in a network shown in FIG. 1 by using an example in which the terminal device 111 sends a packet to the server 150. The terminal device 111 first sends the packet to the base station 121 through the access network 120, and the base station 121 forwards the packet to the network device 131. The network device 131 may send the packet to the network device 132 through the transport network 130, the network device 132 forwards the packet to the gateway device 141, the gateway device 141 may send the packet to the network device 142 through the mobile core network 140, and finally the network device 142 sends the packet to the server 150. Similarly, in a process in which the server 150 needs to send the packet to the terminal device 111, the packet may sequentially pass through the network device in the mobile core network, the network device in the transport network, and the network device in the access network.

It can be learned that the transport network is located between the access network and the mobile core network, and is used to transmit the packet between the access network and the mobile core network. The network device in the transport network that communicates with the network device in the access network may receive a packet sent by the network device in the access network, and send the packet to the network device in the mobile core network. The network device in the transport network that communicates with the network device in the mobile core network may receive a packet sent by the network device in the mobile core network, and send the packet to the network device in the access network. In the transport network, a network device connected to the network device in the access network and a network device connected to the network device in the mobile core network may be referred to as edge network devices in the transport network, and the edge network devices may communicate with each other by using another network device. For example, in FIG. 1, the network device 131, the network device 132, the network device 133, and the network device 134 are the edge network devices in the transport network. The network device 131 and the network device 132, and the network device 133 and the network device 134 may communicate with each other by using another network device. This is not shown in FIG. 1.

In technologies such as 5G, a network may be divided into a plurality of network slices by using a network slicing technology, to ensure normal data transmission in the network. Different network slices may have different transmission features, and may meet different service requirements. For example, a network slice A may feature a low delay and a small bandwidth. In this case, the network slice A may be used to transmit data of a service with a high delay requirement but a low bandwidth requirement, for example, data generated by a financial service and an internet of vehicles service. A network slice B features a large bandwidth and a high data delay. In this case, the network slice B may be used to transmit data of a service with a high bandwidth requirement but a low delay requirement, for example, data generated by a file transfer service. In this way, the network is divided into the plurality of network slices based on a network transmission feature, and a most appropriate network slice may be selected based on a service feature to transmit data of the service, to improve quality of service.

When the transport network is divided into a plurality of network slices, a device in the transport network may select the network slice of the transport network to forward a packet, so as to forward the packet by using a proper network resource. However, when the edge network device in the transport network receives a packet sent by the network device in the access network (or the mobile core network), the edge network device cannot determine a network slice that needs to send the packet and that is of the transport network.

To resolve the foregoing problem, an embodiment of this application provides a packet processing method. After receiving a first packet, a network device in an access network or in a mobile core device may determine network slice mapping information of the first packet, and send, to a network device in a transport network, a second packet that includes the network slice mapping information. In this way, the network device in the transport network may determine a corresponding network slice of the transport network based on the network slice mapping information, to transmit the second packet by using the corresponding network slice of the transport network.

The packet processing method provided in this embodiment of this application may be applied to the network architecture shown in FIG. 1.

In this embodiment of this application, a terminal device such as the terminal device 111, the terminal device 112, or the terminal device 113 may also be referred to as user equipment (UE), a mobile station (MS), a mobile terminal (MT), a terminal, or the like, and is a device that provides voice and/or data connectivity for a user, or a chip disposed in the device, for example, a handheld device or a vehicle-mounted device having a wireless connection function. Currently, for example, the terminal device is a mobile phone, a desktop computer, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a residential gateway device (5G-RG) that supports 5G access, or the like.

In the embodiment shown in FIG. 1, the network device in the access network includes the base station 121 and the base station 122. In some other implementations, the network device in the access network may alternatively be another device, for example, customer premises equipment. The network device 131, the network device 132, the network device 133, or the network device 134 is the network device in the transport network, and may be an entity device that supports a routing function, for example, a router or a switch, or may be a server on which a virtual router or a virtual switch is deployed. The network device in the mobile core network includes the gateway device 141 and the network device 142. The gateway device may also be referred to as an inter-network connector or a protocol converter, and may be used in a computer system or a device that provides a service of data conversion between the transport network and the mobile core network. The network device 142 may be a device like a router or a switch. The server 150 may be, for example, a server in a data center (data center, DC).

Figure 2:
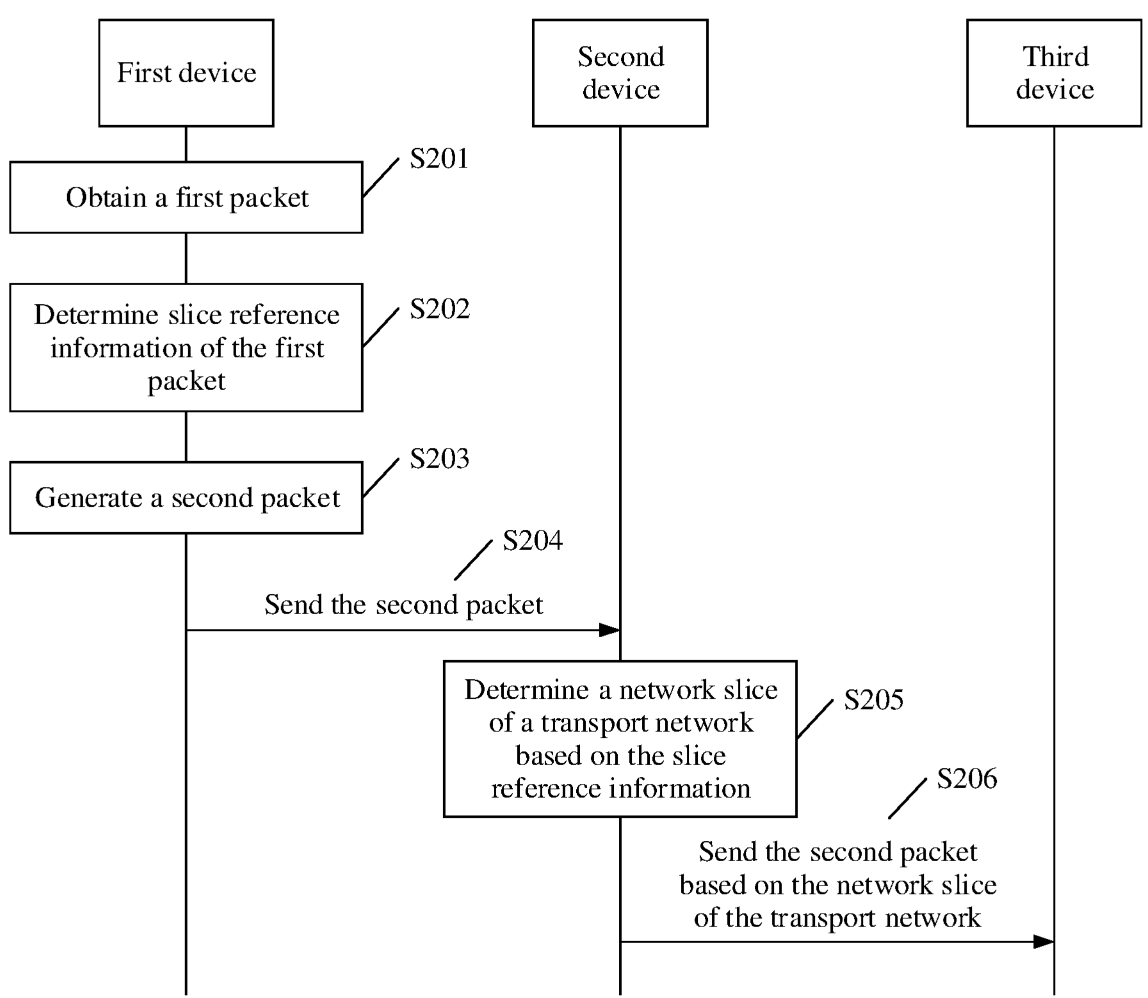
FIG. 2 is a signaling interaction diagram of a packet forwarding method according to an embodiment of this application.

FIG. 2 is a signaling interaction diagram of a packet forwarding method according to an embodiment of this application. The packet forwarding method provided in this embodiment of this application may include the following steps.

S201: A first device obtains the first packet.

In this embodiment of this application, the first device may be the network device in the access network or the network device in the mobile core network, for example, may be any one of the network device 121, the network device 122, the gateway device 141, or the network device 142 in FIG. 1. The first packet may be a packet that needs to be sent to the network device in the transport network by using the first device. For example, when the first device is the network device in the access network, the first packet may be a packet sent by a terminal device to the first device and then sent by the first device to the network device in the transport network. When the first device is the network device in the mobile core network, the first packet may be a packet sent by a network device or a server in another mobile core network to the first device and then sent by the first device to the network device in the transport network.

FIG. 1 is used as an example for description. It is assumed that the terminal device 111 sends a request packet to the server 150. The request packet may successively pass through the base station 121, the network device 131, the network device 132, the gateway device 141, and the network device 142, and finally arrives at the server 150. After receiving the request packet, the server 150 may generate a response packet and send the response packet to the network device 142. The response packet is forwarded by the gateway device 141, the network device 132, the network device 131, and the base station 131, and finally arrives at the server 150.

It can be learned that, during transmission of the request packet, the base station 121 may send the request packet to the network device 131 as the network device in the transport network. In this case, the base station 121 may serve as the first device to obtain the request packet as the first packet. However, during transmission of the response packet, the gateway device 141 may send the response packet to the network device 132 as the network device in the transport network. In this case, the gateway device 141 may serve as the first device to obtain the response packet as the first packet.

S202: The first device determines the network slice mapping information of the first packet.

After obtaining the first packet, the first device may determine the network slice mapping information of the first packet. The network slice mapping information is used to determine a network slice that corresponds to the first packet and that is of the transport network. In this embodiment of this application, the network slice mapping information may include information about the access network or the mobile core network, or may include information about the network slice of the transport network. The following separately describes the two cases.

A case in which the network slice mapping information includes the information about the access network or the mobile core network is first described. Specifically, the information about the access network or the mobile core network may be a first network slice identifier and/or a quality of service parameter.

The first network slice identifier identifies a network slice of the access network or a network slice of the core network. When the first device is the network device in the access network, the first network slice identifier identifies a network slice that transmits the first packet and that is of the access network. When the first device is the network device in the mobile core network, the first network slice identifier identifies a network slice that transmits the first packet and that is of the mobile core network. In this embodiment of this application, the first network slice identifier may be a single network slice selection assistance information (S-NSSAI) identifier, a network slice instance (NSI) identifier, a network slice subnet instance (NSSI) identifier, or the like.

The quality of service parameter is a parameter that describes quality of service required by a network or a network slice for transmitting the first packet. In this embodiment of this application, a quality of service parameter of the first packet may include parameters such as an isolation level, a packet delay budget (PDB), a jitter, and a maximum packet loss rate. The quality of service parameter may alternatively be a quality of service profile parameter. The following describes in detail the quality of service parameter.

The isolation level of the first packet indicates an isolation status between a network slice corresponding to the first packet and another network slice. An example is used for description. If a value of the isolation level of the first packet is 2, it indicates that the isolation status between the network slice corresponding to the first packet and the another network slice is logical isolation. If a value of the isolation level is 1, it indicates that the isolation status between the network slice corresponding to the first packet and the another network slice is physical isolation. A value of the packet delay budget of the first packet is an upper bound of a delay of transmitting a data packet in the network slice corresponding to the first packet, namely, total duration from a time when the first packet is sent by the terminal device to a time when a destination device of the first packet receives the packet. A value of the jitter of the first packet is a maximum value of a delay difference between any two adjacent data frames transferred by the network slice corresponding to the first packet. The maximum packet loss rate of the first packet is a ratio of packets that can be discarded when the network slice corresponding to the first packet transmits a data flow to total packets.

For detailed descriptions of each parameter in the quality of service parameter, refer to the global system for mobile communications alliance (GSMA) generic network slice template protocol. Details are not described herein again.

The foregoing describes definitions of the first network slice identifier and the quality of service parameter. The following separately describes a method for determining the network slice mapping information by the first device in the following two cases: when the network slice mapping information includes the first network slice identifier and when the network slice mapping information includes the quality of service parameter.

When the network slice mapping information includes the first network slice identifier, the first device may obtain the network slice mapping information by using two different methods.

In a first possible implementation, the first packet includes the first network slice identifier. In this case, when determining the network slice mapping information, the first device may parse the first packet, and extract the first network slice identifier carried in the first packet, to obtain the network slice mapping information.

In a second possible implementation, the first packet does not include the first network slice identifier. In this case, when determining the network slice mapping information, the first device may determine the first network slice identifier based on any one or more of attribute information of the first packet, requirement information for transmitting the first packet, a service identifier of the first packet, a flow identifier of the first packet, and a user identifier of the first packet. Details are described below.

The attribute information of the first packet represents an attribute of the first packet, and may include, for example, any one or more of a QoS level of the first packet, a port number of a network port used by the first device to receive the first packet, and a network segment to which the first packet belongs. When the first packet includes the attribute information of the first packet, the first device may prestore a correspondence between the attribute information of the packet and the first network slice identifier. After receiving the first packet, the first device may determine the attribute information of the first packet, and determine the first network slice identifier based on the attribute information of the first packet and the correspondence, to obtain the network slice mapping information.

The requirement information for transmitting the first packet indicates quality of service required by the first packet, and may include, for example, a bandwidth required for transmitting the first packet, a maximum delay corresponding to transmitting the first packet, and a maximum packet loss rate corresponding to the first packet. When the first packet includes the requirement information for transmitting the first packet, the first device may prestore a correspondence between the requirement information and the first network slice identifier. After receiving the first packet, the first device may determine the requirement information for transmitting the first packet, and determine the first network slice identifier based on the requirement information for transmitting the first packet and the correspondence, to obtain the network slice mapping information.

The service identifier of the first packet may be an identifier of a service instance to which the first packet belongs, and indicates a service instance from which the first packet is generated. The service instance is a service type running on the terminal device, and may include, for example, an audio/video service and a non-audio/video service. Optionally, based on the service instance to which the first packet belongs, the service identifier of the first packet may be added to the first packet by a device that generates the first packet. When the first packet includes the service identifier of the first packet, the first device may prestore a correspondence between the service identifier of the packet and the first network slice identifier. After receiving the first packet, the first device may determine the service identifier of the first packet, and determine the first network slice identifier based on the service identifier of the first packet and the correspondence, to obtain the network slice mapping information.

The flow identifier of the first packet is an identifier of a data flow to which the first packet belongs, and indicates the data flow to which the first packet belongs. Optionally, based on a service flow to which the first packet belongs, the flow identifier of the first packet may be added to the first packet by a device that generates the first packet. When the first packet includes the flow identifier of the first packet, the first device may prestore a correspondence between the flow identifier of the packet and the first network slice identifier. After receiving the first packet, the first device may determine the flow identifier of the first packet, and determine the first network slice identifier based on the flow identifier of the first packet and the correspondence, to obtain the network slice mapping information.

The user identifier of the first packet may be an identifier of a device that generates the first packet, may be, for example, an IP address or a media access control (Media Access Control, MAC) address of a terminal device that generates the first packet, and indicates a device by which the first packet is generated. The user identifier of the first packet may alternatively be a user identifier of an application that generates the first packet, and the application may be installed on a device that generates the first packet. Optionally, the user identifier of the first packet may be added to the first packet by the device that generates the first packet when generating the first packet. When the first packet includes the user identifier of the first packet, the first device may prestore a correspondence between the user identifier and the first network slice identifier. After receiving the first packet, the first device may determine the user identifier of the first packet, and determine the first network slice identifier based on the user identifier of the first packet and the correspondence, to obtain the network slice mapping information.

It should be noted that the reason why the first packet does not include the first network slice identifier may be that the network device in the access network (or the network device in the mobile core network) does not add an identifier of the network slice of the access network (or the mobile core network) to the first packet, or the access network (or the mobile core network) are not divided into network slices.

The foregoing describes the method for determining the network slice mapping information by the first device when the network slice mapping information includes the first network slice identifier. The following describes the method for determining the network slice mapping information by the first device when the network slice mapping information includes the quality of service parameter.

When the network slice mapping information includes the quality of service parameter, the first device may determine the network slice mapping information by using two different methods.

In a first possible implementation, the first device may determine the quality of service parameter based on the first network slice identifier. Specifically, the first device may prestore a correspondence between the first network slice identifier and the quality of service parameter. After the first device receives the first packet, when the first packet includes the first network slice identifier, the first device may parse the first packet to obtain the first network slice identifier, and further determine, based on the prestored correspondence, the quality of service parameter corresponding to the first network slice identifier. When the first packet does not include the first network slice identifier, the first device may determine the first network slice identifier based on one or more of a service identifier, a flow identifier, a user identifier, attribute information, requirement information, and the like in the first packet, and then determine, based on the prestored correspondence, the quality of service parameter corresponding to the first network slice identifier. For a specific method for determining the first network slice identifier by the first device, refer to the foregoing descriptions. Details are not described herein again.

In a second possible implementation, the first device may determine the quality of service parameter based on attribute information of the first packet or requirement information for transmitting the first packet. For descriptions of the attribute information and the requirement information, refer to the foregoing descriptions. Details are not described herein again.

When determining the quality of service parameter based on the attribute information of the first packet, the first device may parse the attribute information of the first packet, and determine, based on the attribute information of the first packet, quality of service required for transmitting the first packet, to obtain the quality of service parameter, so as to obtain the network slice mapping information.

When determining the quality of service parameter based on the requirement information for transmitting the first packet, the first device may determine, by sorting out the requirement information for transmitting the first packet, quality of service required for transmitting the first packet, to obtain the quality of service parameter, so as to obtain the network slice mapping information.

The foregoing describes a case in which the network slice mapping information includes the information about the access network or the mobile core network. The following describes a case in which the network slice mapping information includes the information about the network slice of the transport network.

In this embodiment of this application, the information about the network slice of the transport network may include any one or more of a quality of service parameter identifier, a VPN identifier, a network slice identifier of the transport network, a service slice identifier, a resource slice identifier, and the like. The following describes the information.

The quality of service parameter identifier is an identifier of the quality of service parameter. One quality of service parameter identifier may identify a group of quality of service parameters, and the group of quality of service parameters may include one or more quality of service parameters. The quality of service parameter identifier corresponds to the network slice of the transport network, and may indicate a quality of service level of the network slice of the transport network. When the quality of service parameter is a quality of service overview parameter, the quality of service parameter identifier is a quality of service overview identifier.

An example is used for description. It is assumed that the transport network includes three network slices of the transport network: a network slice 1 of the transport network, a network slice 2 of the transport network, and a network slice 3 of the transport network. A packet delay budget of each of the network slice 1 of the transport network and the network slice 2 of the transport network are 1 millisecond, and a packet delay budget of the network slice 3 of the transport network are 2 millisecond. In this case, a quality of service parameter identifier corresponding to the network slice 1 of the transport network and the network slice 2 of the transport network may be A, indicating that the network slice 1 of the transport network and the network slice 2 of the transport network are network slices of the transport network with a high quality of service level. A quality of service parameter identifier corresponding to the network slice 3 of the transport network may be B, indicating that the network slice 1 of the transport network and the network slice 2 of the transport network are network slices of the transport network with a low quality of service level. In this case, if a packet delay budget of the first packet is 1 millisecond, a quality of service parameter identifier of the first packet is A. If a packet delay budget of the first packet is 2 millisecond, a quality of service parameter identifier of the first packet is B.

When the first packet is a packet transmitted through a VPN, the first packet may include a VPN identifier for transmitting the first packet, and the VPN identifier is an identifier of the VPN used by the first packet.

When the transport network is divided into a plurality of network slices, the transport network may be divided into a plurality of service slices based on a service type corresponding to the network slice, or the transport network may be divided into a plurality of resource slices based on a network resource occupied by the network slice, or the transport network may be divided into a plurality of network slices based on other principles than a service type and a network resource.

When the transport network is not divided into a service slice and a resource slice, the network slice mapping information corresponding to the first packet may include a transport network slice identifier. The transport network slice identifier identifies the network slice that corresponds to the first packet and that is of the transport network. When the transport network is divided into the plurality of service slices, the network slice mapping information may include the service slice identifier, indicating a service slice through which a second packet corresponding to the first packet needs to be transmitted. When the transport network is divided into a plurality of resource slices, the network slice mapping information may include the resource slice identifier, indicating a resource slice through which a second packet corresponding to the first packet needs to be transmitted. Optionally, the resource slice identifier is used to specify a transport network underlay network corresponding to the first packet.

The foregoing describes the information about the network slice of the transport network. The following describes the method for determining the network slice mapping information by the first device when the network slice mapping information includes the information about the network slice of the transport network.

When the network slice mapping information includes the information about the network slice of the transport network, the first device may determine the network slice mapping information by using two different methods.

In a first possible implementation, the first device may determine the network slice mapping information based on a first network slice identifier. Specifically, the first device may prestore a correspondence between the first network slice identifier and the network slice mapping information, and determine the network slice mapping information with reference to the correspondence.

An example in which the network slice mapping information includes the transport network slice identifier is used for description. The first device may prestore a correspondence between the transport network slice identifier and the first network slice identifier, namely, a correspondence between an identifier of the network slice of the transport network and an identifier of the network slice of the access network (or the mobile core network). After receiving the first packet, the first device may determine, based on the prestored correspondence, the transport network slice identifier corresponding to the first network slice identifier. For a specific method for obtaining the first network slice identifier by the first device, refer to the foregoing descriptions. Details are not described herein again.

In a second possible implementation, the first device may determine the network slice mapping information based on attribute information of the first packet or requirement information for transmitting the first packet. For descriptions of the attribute information and the requirement information, refer to the foregoing descriptions. Details are not described herein again. Optionally, the first device may prestore a correspondence between the attribute information of the first packet and the network slice mapping information, or a correspondence between the requirement information for transmitting the first packet and the network slice mapping information. After the first packet is received, the attribute information of the first packet or the requirement information for transmitting the first packet may be determined, and then the network slice mapping information is obtained with reference to the correspondence.

The foregoing possible implementations do not constitute a limitation on the technical solutions in embodiments of this application, and a person skilled in the art may design the implementations based on an actual situation.

S203: The first device generates the second packet based on the first packet.

After determining the network slice mapping information of the first packet, the first device may generate the second packet based on the first packet. The second packet includes the network slice mapping information. Optionally, the first device may add the network slice mapping information to a packet header of the first packet, and use the new packet as the second packet. Certainly, the first device may alternatively generate a new packet header, and encapsulate the new packet header and data carried in the first packet into the second packet. A specific method for generating the second packet by the first device based on the first packet is not limited in this embodiment of this application.

In this embodiment of this application, the network slice mapping information may be carried in one or more of an IPv6 extension header, an IPv6 basic header, an Ethernet (Ethernet) extension header, or an MPLS header of the second packet.

The following separately describes the four cases.

In a first possible implementation, the network slice mapping information is carried in the IPv6 extension header of the second packet. The IPv6 extension header may include any one or more of a hop by hop options header, a destination options header, a routing header, and a segment routing header.

In this embodiment of this application, the network slice mapping information may be carried in any one of the foregoing IPv6 extension headers. Optionally, if the network slice mapping information is carried in the IPv6 extension header of the second packet, the network slice mapping information may be carried in a TLV field of the IP extension header.

In a second possible implementation, the network slice mapping information is carried in the IPv6 basic header of the second packet. The IPv6 basic header may include a source address (SA) field, a destination address (DA) field, and a flow label field. The network slice mapping information may be carried in one or more of the three fields.

In a third possible implementation, the network slice mapping information is carried in the Ethernet header. Specifically, the Ethernet header may include a VLAN ID field, and is used to carry the network slice mapping information. Optionally, if a length of the network slice mapping information is greater than a length of the VLAN ID field, the network slice mapping information may be carried in a plurality of adjacent VLAN ID fields. For example, it is assumed that the network slice mapping information is S-NSSAI. The S-NSSAI includes an 8-bit slice service type and a 24-bit slice differentiator (SD), that is, a total length of S-NSSAI is 32 bits. Because a length of each VLAN ID field is 12 bits, the network slice mapping information may be carried in three adjacent VLAN ID fields. Because a total length of the three VLAN ID fields is 36 bits, and is greater than the length of the network slice mapping information, the three VLAN ID fields can contain the network slice mapping information.

In a fourth possible implementation, the network slice mapping information is carried in the MPLS header. The MPLS header is an area for carrying an MPLS label in a packet header.

In this embodiment of this application, if the network slice mapping information is carried in the MPLS header of the second packet, the MPLS header may include a plurality of MPLS labels for carrying the network slice mapping information. Optionally, if the length of the network slice mapping information is greater than a length of one MPLS label, the network slice mapping information may be carried in a plurality of adjacent MPLS labels. For example, it is assumed that the length of the network slice mapping information is 32 bits, and a length of each MPLS label is 20 bits. Because a total length of the two MPLS labels is 40 bits, and is greater than the length of the network slice mapping information, the network slice mapping information may be carried in two adjacent MPLS labels.

The foregoing separately describes the IPv6 extension header, the IPv6 basic header, the Ethernet header, and the MPLS header. The following describes, in a packet, possible locations of fields corresponding to the IPv6 extension header, the IPv6 basic header, the Ethernet header, and the MPLS header.

Figures 3, 4:
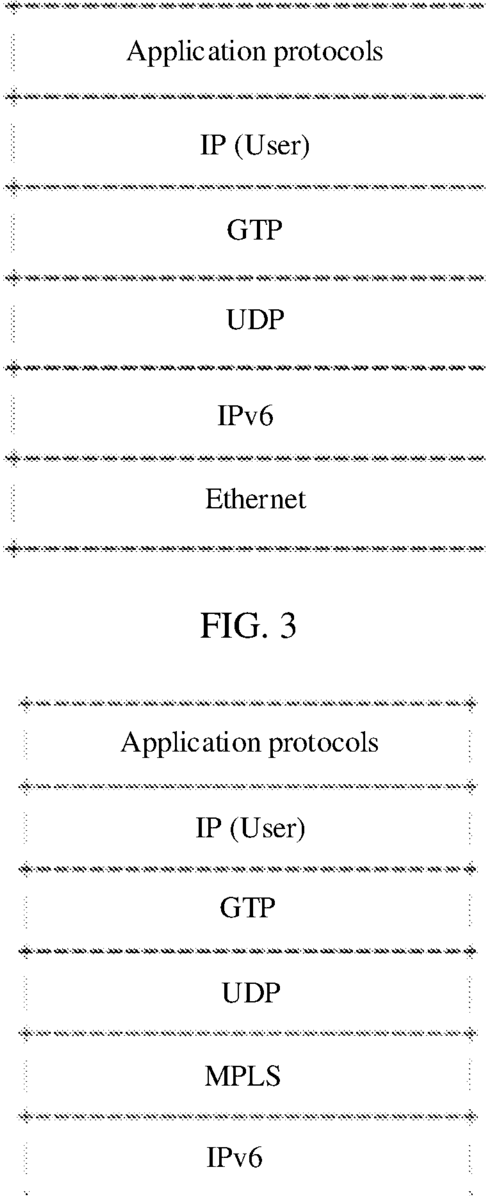
FIG. 3 is a schematic diagram of a possible format of a packet header that does not include an MPLS header according to an embodiment of this application.
FIG. 4 is a schematic diagram of a possible format of a packet header that includes an MPLS header according to an embodiment of this application.

FIG. 3 is a schematic diagram of a possible format of a packet header that does not include the MPLS header. It can be seen from the figure that the packet header may include an application protocol extension header, an IP (User) basic header, a general packet radio service (GPRS) tunneling protocol (GPRS Tunneling Protocol) extension header, a user datagram protocol (UDP) extension header, the IPv6 extension header, and an Ethernet extension header. The IP basic header is the IPv6 basic header.

FIG. 4 is a schematic diagram of a possible format of a packet header that includes the MPLS header. As shown in the figure, the MPLS header may be located between a UDP extension header and the IPv6 extension header.

S204: The first device sends the second packet to a second device.

After generating the second packet, the first device may send the second packet to the second device. The second device is the network device in the transport network, for example, may be any one of the network device 131, the network device 132, the network device 133, and the network device 134 in FIG. 1.

S205: The second device determines the network slice of the transport network based on the network slice mapping information.

After receiving the second packet, the second device may determine, based on the network slice mapping information, the network slice that corresponds to the first packet and that is of the transport network. Optionally, based on the network slice mapping information, the second device may determine the identifier of the network slice of the transport network, namely, the transport network slice identifier (TNSI), to determine the network slice that corresponds to the first packet and that is of the transport network.

It can be learned from the foregoing descriptions that the network slice mapping information may include the information about the access network (or the mobile core network), or may include the information about the network slice of the transport network. The following describes in detail a method for determining the network slice of the transport network by the second device.

In a first possible implementation, the network slice mapping information includes the information about the access network or the mobile core network, that is, the network slice mapping information includes the first network slice identifier and/or the quality of service parameter. In this case, when determining the network slice of the transport network, the second device may determine the network slice of the transport network based on a prestored correspondence.

An example in which the network slice mapping information includes the quality of service parameter is used for description. The second device may prestore a correspondence between the quality of service parameter and the transport network slice identifier. In this way, after receiving the second packet, the second device may parse the second packet, extract the quality of service parameter, and then determine, based on the correspondence, the transport network slice identifier corresponding to the second packet, to determine a network slice that corresponds to the transport network slice identifier and that is of the transport network.

In a second possible implementation, the network slice mapping information includes the information about the network slice of the transport network, that is, the network slice mapping information includes any one or more of the quality of service parameter identifier, the VPN identifier, the transport network slice identifier, the service slice identifier, and the resource slice identifier. The second device may directly determine the corresponding network slice of the transport network based on the network slice mapping information.

An example in which the network slice mapping information includes the quality of service parameter identifier is used for description. When dividing the transport network into a plurality of network slices, the second device may analyze a quality of service parameter of each network slice of the transport network, to determine a quality of service parameter identifier corresponding to each network slice of the transport network. In this way, after receiving the second packet, the second device may parse the second packet, extract the quality of service parameter identifier, and then determine, from the plurality of network slices of the transport network, a network slice that corresponds to the quality of service parameter identifier in the second packet and that is of the transport network.

S206: The second device sends the second packet to a third device by using a network resource corresponding to the network slice of the transport network.

After determining the network slice of the transport network, the second device may send the second packet to the third device by using the network resource corresponding to the network slice of the transport network. The third device may be a network device connected to the second device through the transport network, for example, may be another network device in the transport network. In this embodiment of this application, when the second device is the network device 131 in FIG. 1, the third device may be the network device 132. When the second device is the network device 134, the third device may be the network device 133.

After determining the network slice of the transport network, the second device may send the second packet to the third device by using the network resource corresponding to the network slice of the transport network. The network resource may include any one or more of a bandwidth resource, a cache resource, and a queue resource.

In the packet forwarding method provided in this embodiment of this application, before sending a packet to the second device serving as the network device in the transport network, the first device serving as the network device in the access network or the network device in the mobile core network may first determine network slice mapping information of the packet, and carry the network slice mapping information in the packet. In this way, before the network device in the transport network receives the packet, the first device may determine in advance a condition (namely, the network slice mapping information) that needs to be met by a network slice that transmits the packet and that is of the transport network, carry the condition in the packet, and send the packet to the network device in the transport network. After receiving the packet, the network device in the transport network may determine, based on the network slice mapping information carried in the packet, the condition that needs to be met by a network slice that transmits the packet and that is of the transport network. In this way, the network device in the transport network may select a network slice that meets the network slice mapping information and that is of the transport network, to forward the packet.

Figure 5:
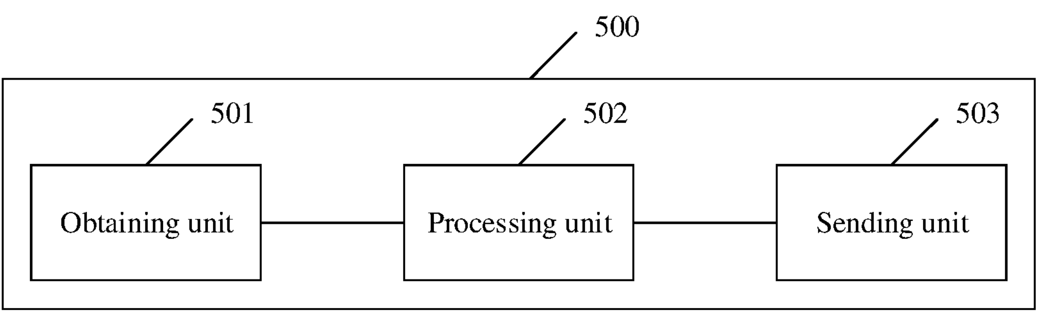
FIG. 5 is a schematic diagram of a structure of a first device according to an embodiment of this application.

FIG. 5 is a schematic diagram of a possible structure of the first device in the foregoing embodiment. The device 500 may provide functions of the first device in the example shown in FIG. 2. Refer to FIG. 5. The network device 500 includes an obtaining unit 501, a processing unit 502, and a sending unit 503. These units may provide corresponding functions of the first device in the foregoing method examples. The obtaining unit 501 is configured to support the device 500 in performing S201 in FIG. 2. The processing unit 502 is configured to support the network device 500 in performing S202 and S203 in FIG. 2. The sending unit 503 is configured to support the network device 500 in performing S204 in FIG. 2. For example, the receiving unit 501 is configured to obtain a first packet. The first device is a network device in an access network or in a mobile core network. The processing unit 502 is configured to: determine network slice mapping information based on the first packet, and generate a second packet based on the first packet. The second packet includes the network slice mapping information. The sending unit 503 is configured to send the second packet to a second device. The second device is a network device in a transport network. The network slice mapping information is used to determine a network slice that forwards the second packet and that is of the transport network. For a specific execution process, refer to the detailed descriptions of corresponding steps in the foregoing embodiment shown in FIG. 2. Details are not described herein again.

Figure 6:
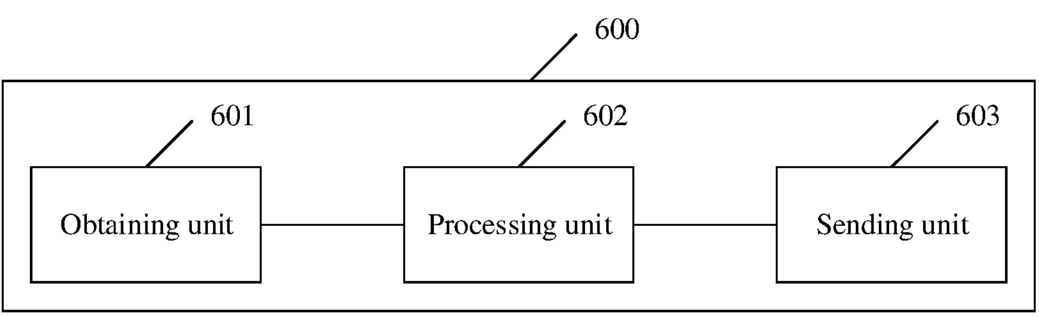
FIG. 6 is a schematic diagram of a structure of a second device according to an embodiment of this application.

FIG. 6 is a schematic diagram of a possible structure of the second device in the foregoing embodiment. The device 600 may provide functions of the second device in the example shown in FIG. 2. Refer to FIG. 6. The network device 600 includes an obtaining unit 601, a processing unit 602, and a sending unit 6033. These units may provide corresponding functions of the second device in the foregoing method examples. For example, the receiving unit 601 is configured to receive a second packet from the first device. The second packet includes network slice mapping information. The first device is a network device in an access network or in a mobile core network, and the second device is a network device in a transport network. The processing unit 602 is configured to determine a corresponding network slice of the transport network based on the network slice mapping information. The sending unit is configured to send the second packet by using a network resource corresponding to the network slice of the transport network. For a specific execution process, refer to the detailed descriptions of corresponding steps in the foregoing embodiment shown in FIG. 2. Details are not described herein again.

It should be noted that, in embodiments of this application, division into units is an example and is merely logical function division. During actual implementation, there may be another division manner. Functional units in embodiments of this application may be integrated into one processing unit, or each of the units may exist alone physically, or two or more units are integrated into one unit. For example, in the foregoing embodiment, the obtaining unit and the processing unit may be a same unit or different units. The integrated unit may be implemented in a form of hardware, or may be implemented in a form of a software functional unit.

Figure 7:
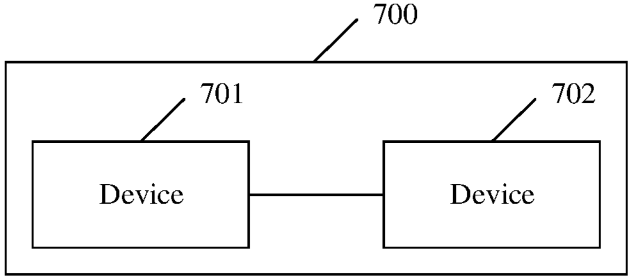
FIG. 7 is a schematic diagram of a structure of a network system according to an embodiment of this application.

Refer to FIG. 7. An embodiment of the present invention provides a network system 700. The system 700 is configured to implement the packet forwarding method and the packet processing method in the foregoing method embodiments. The system 700 includes a device 701 and a device 702. The device 701 may provide functions of the first device in the embodiment shown in FIG. 2, and the device 702 may provide functions of the second device in the embodiment shown in FIG. 2. For a specific execution process, refer to the detailed descriptions of corresponding steps in the foregoing embodiment shown in FIG. 2. Details are not described herein again.

Figure 8:
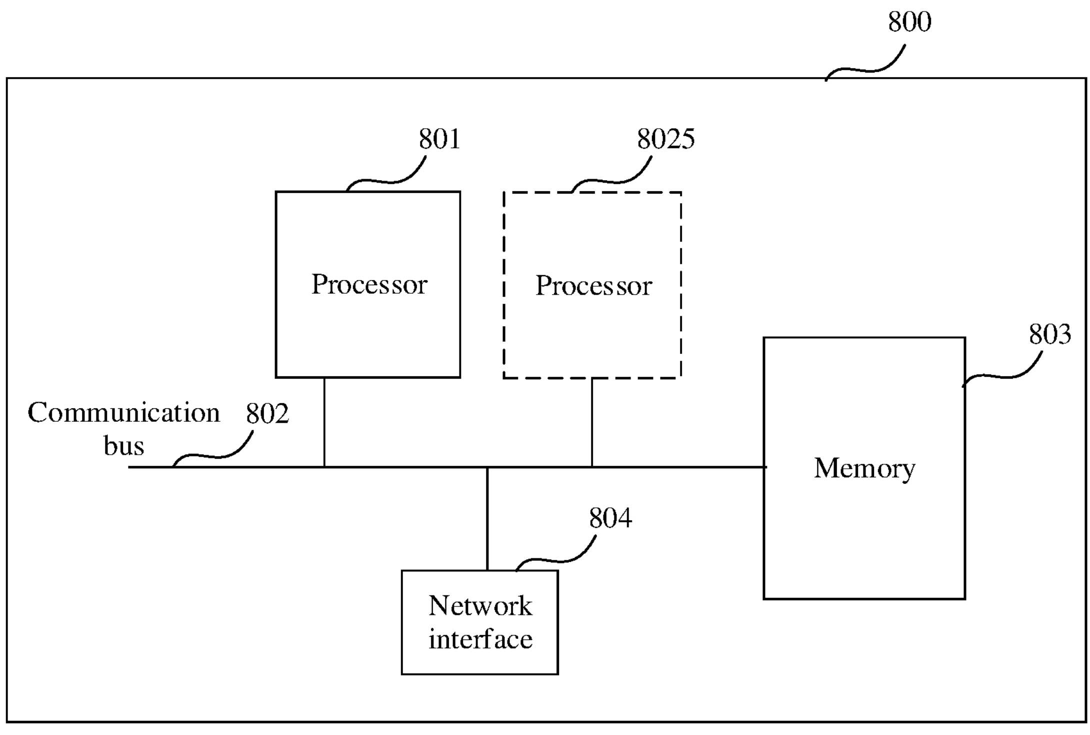
FIG. 8 is a schematic diagram of a structure of a device according to an embodiment of this application.

FIG. 8 is a schematic diagram of a structure of a device 800 according to an embodiment of this application. The network device 500 in FIG. 5 and the network device 600 in FIG. 6 may be implemented by using the device shown in FIG. 8. Refer to FIG. 8. The device 800 includes at least one processor 801, a communication bus 802, and at least one network interface 804. Optionally, the device 800 may further include a memory 803.

The processor 801 may be a general-purpose central processing unit (CPU), an application-specific integrated circuit (ASIC), or one or more integrated circuits (ICs) for controlling program execution of the solutions of this application. The processor may be configured to process a packet, to implement the packet forwarding method and the packet processing method provided in embodiments of this application. For example, when the first device in FIG. 2 is implemented by using the device shown in FIG. 8, the processor may be configured to: obtain a first packet, determine network slice mapping information based on the first packet, generate a second packet based on the first packet, where the second packet includes the network slice mapping information, and send the second packet to the second device. The second device is a network device in a transport network. The network slice mapping information is used to determine a network slice that forwards the second packet and that is of the transport network. For another example, when the second device in FIG. 2 is implemented by using the device shown in FIG. 8, the processor may be configured to: receive a second packet from the first device, where the second packet includes network slice mapping information, and the first device is a network device in an access network or a mobile core network; determine a corresponding network slice of a transport network based on the network slice mapping information; and send the second packet by using a network resource corresponding to the network slice of the transport network. For a specific function implementation, refer to a processing part of the second device in the method embodiments.

The communication bus 802 is configured to transmit information between the processor 801, the network interface 804, and the memory 803.

The memory 803 may be a read-only memory (ROM) or another type of static storage device that may store static information and instructions. The memory 803 may alternatively be a random access memory (RAM) or another type of dynamic storage device that may store information and instructions, or may be a compact disc read-only memory (CD-ROM) or another optical disc storage, an optical disc storage (including a compact disc, a laser disc, an optical disc, a digital versatile disc, a Blu-ray disc, and the like), a disk storage medium or another magnetic storage device, or any other medium that can be configured to carry or store expected program code in a form of instructions or a data structure and that can be accessed by a computer. However, the memory is not limited thereto. The memory 803 may exist independently, and is connected to the processor 801 through the communication bus 802. Alternatively, the memory 803 and the processor 801 may be integrated together.

Optionally, the memory 803 is configured to store program code or instructions for executing the solutions of this application, and the processor 801 controls the execution. The processor 801 is configured to execute the program code or the instructions stored in the memory 803. The program code may include one or more software modules. Optionally, the processor 801 may alternatively store the program code or the instructions for executing the solutions of this application. In this case, the processor 801 does not need to read the program code or the instructions from the memory 803.

The network interface 804 may be an apparatus such as a transceiver, and is configured to communicate with another device or a communication network. The communication network may be an Ethernet, a radio access network (RAN), a wireless local area network (WLAN), or the like. In this embodiment of this application, the network interface 804 may be configured to receive a packet sent by another node in a segment routing network, or may send a packet to another node in a segment routing network. The network interface 804 may be an Ethernet interface, a fast Ethernet (FE) interface, a gigabit Ethernet (gigabit Ethernet, GE) interface, or the like.

During specific implementation, in an embodiment, the device 800 may include a plurality of processors, for example, the processor 801 and a processor 405 in FIG. 8. Each of the processors may be a single-core processor (single-CPU) or a multi-core processor (multi-CPU). The processor herein may be one or more devices, circuits, and/or processing cores configured to process data (for example, computer program instructions).

Figure 9:
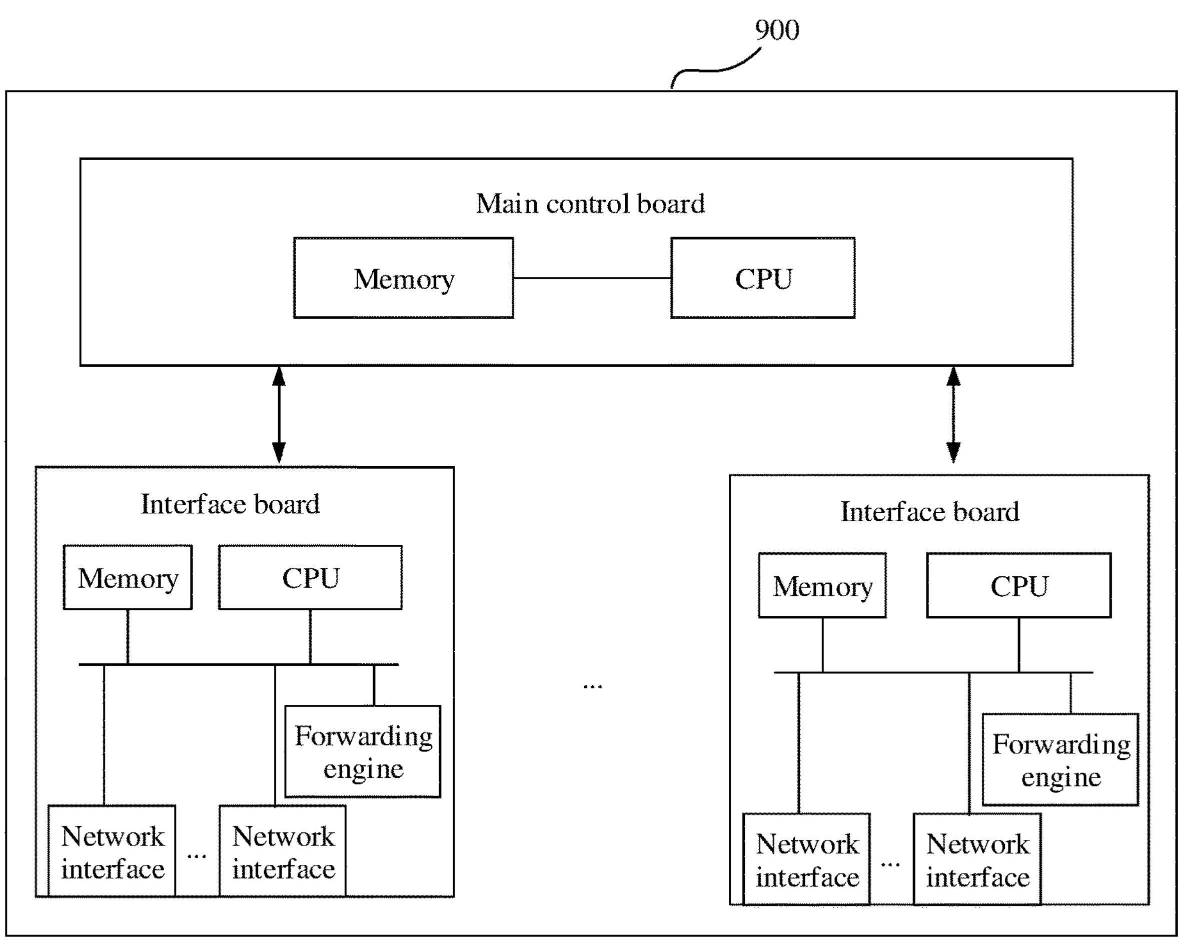
FIG. 9 is a schematic diagram of a structure of a device according to an embodiment of this application.

FIG. 9 is a schematic diagram of a structure of a device 900 according to an embodiment of this application. The first device and the second device in FIG. 2 may be implemented by the device shown in FIG. 9. As shown in the schematic diagram of the structure of the device shown in FIG. 9, the device 900 includes a main control board and one or more interface boards. The main control board is communicatively connected to the interface board. The main control board is also referred to as a main processing unit (MPU) or a route processor card. The main control board includes a CPU and a memory, and is responsible for controlling and managing each component in the device 900, including route computation, and device management and maintenance functions. The interface board is also referred to as a line processing unit (LPU) or a line card, and is configured to: receive and send a packet. In some embodiments, the main control board communicates with the interface board through a bus, or the interface boards communicate with each other through a bus. In some embodiments, the interface boards communicate with each other through a switching board. In this case, the device 900 also includes the switching board. The switching board is communicatively connected to the main control board and the interface boards, and is configured to forward data between the interface boards. The switching board may also be referred to as a switch fabric unit (SFU). The interface board includes a CPU, a memory, a forwarding engine, and an interface card (IC). The interface card may include one or more network interfaces. The network interface may be an Ethernet interface, an FE interface, a GE interface, or the like. The CPU is communicatively connected to the memory, the forwarding engine, and the interface card. The memory is configured to store a forwarding table. The forwarding engine is configured to forward a received packet based on the forwarding information table stored in the memory. If a destination address of the received packet is an IP address of the device 900, the forwarding engine sends the packet to the CPU of the main control board or the CPU of the interface board for processing. If a destination address of the received packet is not an IP address of the device 900, the forwarding engine searches the forwarding information table based on the destination address. If a next hop and an outbound interface that correspond to the destination address are found from the forwarding information table, the forwarding engine forwards the packet to the outbound interface corresponding to the destination address. The forwarding engine may be a network processor (NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may also provide functions of the forwarding engine, such as implementing software forwarding based on a general-purpose CPU, so that no forwarding engine is required in the interface board. In some embodiments, the forwarding engine may be implemented by using an ASIC or a field programmable gate array (FPGA). In some embodiments, the memory that stores the forwarding table may alternatively be integrated into the forwarding engine, and is used as a part of the forwarding engine.

An embodiment of this application further provides a chip system, including a processor. The processor is coupled to a memory, and the memory is configured to store a program or instructions. When the program or the instructions are executed by the processor, the chip system is enabled to implement the method of the first device or the second device in the embodiment shown in FIG. 2.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be an FPGA, an ASIC, a system on chip (system on chip, SoC), a CPU, an NP, a digital signal processor (DSP), a microcontroller unit (MCU), a programmable logic device (PLD), or another integrated chip.

It should be understood that the steps in the foregoing method embodiments may be completed by using a hardware integrated logic circuit or instructions in a form of software in the processor. The steps of the methods disclosed with reference to embodiments of this application may be directly performed by a hardware processor, or may be performed by a combination of hardware in the processor and a software module.

An embodiment of this application further provides a computer-readable storage medium, including instructions. When the instructions are run on a computer, the computer is enabled to perform the methods in the foregoing embodiments.

In the specification, claims, and accompanying drawings of this application, the terms "first", "second", "third", "fourth", and so on are intended to distinguish between similar objects but do not necessarily indicate a specific sequence or order. It should be understood that the data termed in such a way are interchangeable in appropriate circumstances, so that embodiments described herein can be implemented in other orders than the order illustrated or described herein. In addition, the terms "include", "have" and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

In this application, "at least one item (piece)" means one or more, and "a plurality of" means two or more. "At least one item (piece) of the following" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. In this application, it is considered that "A and/or B" includes only A, only B, and A and B.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical module division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

A person skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and beneficial effects of the present invention are further described in detail in the foregoing specific implementations. It should be understood that the foregoing descriptions are merely specific implementations of the present invention.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A network device, applied to a first device in an access network or in a mobile core network, wherein the network device comprises:

one or more memories storing instructions; and one or more processors coupled to the one or more memories and configured to execute the instructions, wherein executing the instructions causes the network device to:

obtain a first packet;

determine network slice mapping information based on the first packet;

generate a second packet based on the first packet, wherein the second packet comprises the network slice mapping information; and send the second packet to a second device, wherein the second device is a network device in a transport network, and the network slice mapping information is used by the second device to determine a network slice that forwards the second packet and that is of the transport network;

wherein the second packet is generated by adding the network slice mapping information to a packet header of the first packet, or by generating a new packet header comprising the network slice mapping information and encapsulating the new packet header and data carried in the first packet into the second packet.

2. The network device according to claim 1, wherein the network slice mapping information comprises one or more of the following:

a quality of service parameter, a virtual private network (VPN) identifier, a quality of service parameter identifier, a service slice identifier, a resource slice identifier, or a transport network slice identifier.

3. The network device according to claim 1, wherein the network slice mapping information comprises a first network slice identifier, and the first network slice identifier identifies a network slice that transmits the first packet and that is of the access network, or identifies a network slice that transmits the first packet and that is of the core network.

4. The network device according to claim 1, wherein executing the instructions further causes the network device to:

determine a first network slice identifier based on the first packet, wherein the first network slice identifier identifies a network slice that transmits the first packet and that is of the access network, or identifies a network slice that transmits the first packet and that is of the core network; and determine the network slice mapping information based on the first network slice identifier.

5. The network device according to claim 4, wherein the network device stores a correspondence between the first network slice identifier and the network slice mapping information, and wherein executing the instructions further causes the network device to:

determine the network slice mapping information based on the first network slice identifier and the correspondence.

6. The network device according to claim 1, wherein executing the instructions further causes the network device to:

determine the network slice mapping information based on attribute information of the first packet; or determine the network slice mapping information based on requirement information for transmitting the first packet.

7. The network device according to claim 3, wherein executing the instructions further causes the network device to:

determine the first network slice identifier based on one or more of a service identifier, a flow identifier, or a user identifier of the first packet.

8. The network device according to claim 1, wherein the second packet comprises any one or more of an internet protocol version 6 (IPv6) extension header, an IPv6 basic header, an Ethernet header, or a multiprotocol label switching (MPLS) header, and wherein the any one or more of the IPv6 extension header, the IPv6 basic header, the Ethernet header, or the MPLS header carry the network slice mapping information.

9. The network device according to claim 8, wherein the IPv6 extension header comprises one or more of the following:

a hop-by-hop options header, a destination options header, a routing header, or a segment routing header.

10. The network device according to claim 8, wherein the network slice mapping information is carried in a type-length-value (TLV) field of the IPv6 extension header.

11. The network device according to claim 8, wherein the network slice mapping information is carried in any one or more of a source address field, a destination address field, or a flow label field of the IPv6 basic header.

12. The network device according to claim 8, wherein the Ethernet header comprises a virtual local area network identifier (VLAN ID) field, and the network slice mapping information is carried in the VLAN ID field.

13. The network device according to claim 1, wherein the first device is a base station or customer premises equipment, and the second device is a router or a switch.

14. A network device, applied to a second network device in a transport network, wherein the network device comprises:

one or more memories storing instructions; and one or more processors coupled to the one or more memories and configured to execute the instructions, wherein executing the instructions causes the network device to:

receive a second packet from a first device, wherein the second packet comprises network slice mapping information, and the first device is a network device in an access network or in a mobile core network, wherein the second packet has the network slice mapping information in a packet header, or comprises an encapsulated new packet header having the network slice mapping information and further comprises encapsulated data from a first packet;

determine a corresponding network slice of the transport network based on the network slice mapping information; and send the second packet using a network resource corresponding to the network slice of the transport network.

15. The network device according to claim 14, wherein the network slice mapping information comprises one or more of the following:

a virtual private network (VPN) identifier, a quality of service parameter identifier, a service slice identifier, a resource slice identifier, or a transport network slice identifier.

16. The network device according to claim 14, wherein the network slice mapping information comprises one or more of the following:

a first network slice identifier or a quality of service parameter, wherein the first network slice identifier identifies a network slice that transmits the first packet and that is of the access network, or identifies a network slice that transmits the first packet and that is of the core network.

17. The network device according to claim 16, wherein executing the instructions further causes the network device to:

determine a slice identifier of the corresponding network slice of the transport network based on the network slice mapping information and a correspondence, wherein the correspondence is between the network slice mapping information and a transport network slice identifier, and the transport network slice identifier is a slice identifier of the network slice of the transport network; and wherein executing the instructions further causes the network device to:

send the second packet by using a network resource corresponding to the transport network slice identifier.

18. The network device according to claim 14, wherein the second packet comprises any one or more of an internet protocol version 6 (IPv6) extension header, an IPv6 basic header, an Ethernet header, or an MPLS header, and wherein the any one or more of the IPv6 extension header, the IPv6 basic header, the Ethernet header, or the MPLS header carry the network slice mapping information.

19. The network device according to claim 18, wherein the IPv6 extension header comprises one or more of the following:

a hop-by-hop options header, a destination options header, a routing header, or a segment routing header.

20. A network system comprising:

a first device in an access network or in a mobile core network; and a second device in a transport network;

wherein the first device is configured to:

obtain a first packet;

determine network slice mapping information based on the first packet;

generate a second packet based on the first packet, wherein the second packet comprises the network slice mapping information, wherein the second packet is generated by adding the network slice mapping information to a packet header of the first packet, or by generating a new packet header comprising the network slice mapping information and encapsulating the new packet header and data carried in the first packet into the second packet; and send the second packet to the second device; and wherein the second device is configured to:

receive the second packet from the first device;

determine a corresponding network slice of the transport network based on the network slice mapping information; and send the second packet using a network resource corresponding to the network slice of the transport network.

* * * * *